United States Patent [19]

Dubots et al.

[11] Patent Number: 5,023,212
[45] Date of Patent: Jun. 11, 1991

[54] ELECTRICALLY MELTED MULTIPHASE MATERIAL BASED ON ALUMINA AND ALUMINIUM OXYCARBIDE AND OXYNITRIDE

[75] Inventors: Dominique Dubots, Le Fayet; Pierre Toulouse, Chamonix, both of France

[73] Assignee: Pechiney Electrometallurgie, Courbevoie, France

[21] Appl. No.: 432,769

[22] PCT Filed: Mar. 8, 1989

[86] PCT No.: PCT/FR89/00097

§ 371 Date: Oct. 31, 1989

§ 102(e) Date: Oct. 31, 1989

[87] PCT Pub. No.: WO89/08624

PCT Pub. Date: Sep. 21, 1989

[30] Foreign Application Priority Data

Mar. 11, 1988 [FR] France ................... 88 03415

[51] Int. Cl.$^5$ ............................................. C04B 35/10
[52] U.S. Cl. ........................................ 501/87; 501/96; 501/98; 51/309
[58] Field of Search ................ 501/87, 96, 98; 51/309

[56] References Cited

U.S. PATENT DOCUMENTS

| | | | |
|---|---|---|---|
| 4,059,417 | 11/1977 | Ilmaier et al. | 51/309 |
| 4,320,203 | 3/1982 | Brandt et al. | 501/87 |
| 4,325,710 | 4/1982 | Tanaka et al. | 501/87 X |
| 4,341,533 | 7/1982 | Daire et al. | 501/87 X |
| 4,643,983 | 2/1987 | Zeiringer et al. | 501/87 |
| 4,670,407 | 6/1987 | Kiehl et al. | 501/87 |
| 4,855,264 | 8/1989 | Mathers et al. | 501/98 |
| 4,902,651 | 2/1990 | Wada et al. | 501/87 |

*Primary Examiner*—Karl Group
*Attorney, Agent, or Firm*—Dennison, Meserole, Pollack & Scheiner

[57] ABSTRACT

The invention concerns a multiphase alumina-based material formed by a matrix of corundum in which microcrystalline phases of aluminium oxycarbide, aluminium oxynitride and aluminium oxycarbonitride are homogeneously dispersed. The combined carbon content is between 0.05 and 5% and the combined nitrogen content is from 0.05 to 5% by weight. The material can be produced by the controlled injection of carbon and nitrogen into a molten alumina bath. The material is used for abrasive products and refractory products with high levels of performance.

5 Claims, No Drawings

ELECTRICALLY MELTED MULTIPHASE MATERIAL BASED ON ALUMINA AND ALUMINIUM OXYCARBIDE AND OXYNITRIDE

TECHNICAL FIELD OF THE INVENTION

The invention concerns a novel multiphase material based on alumina and aluminium oxycarbide and oxynitride; it also concerns the process for the preparation of that type of material and the uses thereof in the field of refractory materials and abrasives.

STATE OF THE ART

Refractory materials and abrasives based on electrically melted alumina (corundum) are well known. However those substances do not meet all the requirements made by the users thereof and efforts have been made over many years to improve them. It is known (French Pat. No. 1 308 862=U.S. Pat. No. 3,181,939) that the addition of 10 to 60% of zirconium oxide gives corundum substantially enhanced abrasive properties but the cost of zirconia means that the use thereof is reserved for particular applications.

In our French Pat. No. 2 460 315 (=U.S. Pat. No. 4,341,533) we described a new class of abrasives based on alumina and aluminium oxycarbides ($Al_4O_4C$ and $Al_2OC$), produced by the treatment of melted alumina with a carbonaceous reducing agent, and cooling at a controlled speed. Those materials can also be used as refractory materials in iron and steel metallurgy.

At the present time there is a demand for new types of refractory materials and abrasives which combine qualities that are sometimes contradictory: moderate price, abrasive properties which are equal to or better than those of corundum-zirconia, stability in respect of the phases, resistance to thermal shock, wear and corrosion, capability of being wetted by metallurgical slags and metals, and resistance to alkali metals.

SUBJECT-MATTER OF THE INVENTION

A first subject of the invention is a novel class of electrically melted multiphase alumina-based materials characterised in that they have a combined carbon content of between 0.05 and 5% and a combined nitrogen content of between 0.05 and 5%, said contents preferably being between 1 and 4%. Those materials are also characterised by a fine crystalline structure (obtained by rapid cooling) and by the presence of the following phases: alumina ($Al_2O_3$), aluminium oxynitride (AlON), aluminium oxycarbides ($Al_4O_4C$, $Al_2OC$) and aluminium oxycarbonitride ($Al_xC_yN_zO_t$) which are dispersed homogeneously in a corundum matrix.

A second subject of the invention is a process for the preparation of those novel materials characterised by effecting electrical melting of pure alumina or reducing electrical melting of an alumina-based compound such as bauxite, the melting operation being effected most generally in a polyphase electric arc furnace, and effecting an addition of carbonaceous reducing agent or nitrogen in predetermined amounts and very rapidly cooling the molten reaction product. The cooled product is then crushed and graded in dependence on the uses envisaged therefor.

A third subject of the invention is the application of those materials as high-performance abrasives.

A fourth subject of the invention is the application of those materials as refractory materials, in particular in the metallurgical industries.

DESCRIPTION OF THE INVENTION

We shall first describe the process for the preparation of the materials according to the invention. Operation is in a three-phase electric arc furnace with a maximum power of 170 kVA, and with a capacity of about 100 kg of electrically melted product. The molten alumina bath can be produced by melting pure alumina in the arc furnace itself or by reducing melting of bauxite, the reducing agent being a carbonaceous product such as coke in an amount which is so calculated as to reduce the oxides other than alumina and in particular the oxides of iron, silicon and titanium, to the state of metal which settles at the bottom of the furnace in the form of an Fe-Si-Ti alloy.

The carbonaceous electrodes are hollow so as to permit nitrogen to be injected into the arc. The carbonaceous reducing agent used is only slightly reactive coke (it would also be possible to use pieces of graphite) so that it is not oxidised excessively quickly at the surface of the charge, as the reaction must take place at the surface to prevent any danger of overflowing due to the foaming which would be caused by the formation of carbon monoxide within the molten alumina bath. It is also possible for the carbon to be introduced in the form of a compound such as aluminium carbide $Al_4C_3$.

Nitrogen may be introduced through hollow electrodes or by way of an injection lance which is introduced into the molten alumina or yet again by the introduction into the bath of a nitride compound such as aluminium nitride AlN.

It would be possible to envisage the simultaneous introduction of carbon and nitrogen by virtue of using cyanide derivatives but the toxity thereof means that they have to be excluded in an industrial context.

EMBODIMENTS

In a first test, 100 kg of alumina was melted, with the addition of 9 kg of coke and 60 $m^3$ of nitrogen injected through three hollow electrodes. After passing 620 kWh, 60 kg of a product containing 1.2% of nitrogen and 1.2% of carbon was recovered by pouring. The poor product recovery yield is due solely to the small size of the electric furnace.

In a second test which was carried out under the same conditions but with double the amount of coke (18 kg), the result was a product containing 3% of carbon and 2% of nitrogen, thus confirming what the small-scale tests had shown, that is to say the simultaneous injection of nitrogen and carbon very substantially enhances the reaction yield on the alumina of each of those reactants. In the absence of carbon, the level of absorption of nitrogen is practically zero.

In the different circumstances involved, the electrically melted products were poured so as to produce rapid cooling, using one of the following processes:
pouring in a ladle filled with steel balls which were a few centimeters in diameter, in accordance with our French Pat. No. 2 127 231,
pouring in a thin layer in an ingot mould with thick walls or over a thick metal plate, or
pouring between cooled rolls which were disposed with their axes horizontal and which were spaced by a few centimeters, in accordance with our French Pat. No. 2 499 061 (=EP No. 57 651).

By virtue of using those processes, the cooling rate is at least equal to 50° C. per minute and can very substantially exceed 100° C. per minute, in particular when pouring the product between cooled rolls.

The rapid cooling operation imparts to the products a multiphased structure and a high degree of grain fineness, which are qualities that are essential for the uses envisaged. When polished sections are examined under a microscope, that microstructure is revealed by the observation of single crystals of sizes of less than 100 μm, corresponding to the various phases referred to, being embedded in a matrix whose main constituent is corundum. That microstructure gives the aggregates chemical homogeneity on the millimeter scale, and excellent resistance to mechanical and/or thermal shocks, because it involves a multiphased composite microstructure.

X-ray diffractometric analysis reveals the following phases:

corundum (the majority)

aluminium oxycarbide $Al_2OC$ (that phase being practically the only one present, with a virtual absence of $Al_4O_4C$)

aluminium oxynitride AlON aluminium oxycarbonitrides $Al_xC_yN_zO_t$.

Evaluation of the abrasive properties of the products:

In order to evaluate the abrasive properties of this group of products, we used the test described by C RAGON and H FORESTIER in 'Memoires scientifiques de la Revue de Metallurgie', No. 1, 1973, pages 53 to 59. Those tests were carried out using three products according to the invention. They are characterised by the following compositions:

|  | Nitrogen (% by weight) | carbon |
| --- | --- | --- |
| Product No 1 | 1.1 | 1.2 |
| Product No 2 | 1.9 | 2.5 |
| Product No 3 | 2.4 | 3.2 |

The steel compositions used in carrying out those abrasive tests are XC38 (steel with 0.40% carbon) and Z10 CF17 (ferritic stainless steel with 0.09% carbon, 0.30% sulphur and 17% chromium).

The levels of performance obtained when the tests were carried out are expressed in the form of a coefficient λ which characterises the abrasive capability. That coefficient which is a ratio of volume (of material removed)/surface area (of the wearing face of the abrasive tool) is expressed in millimeters.

The results set out in the following Table make it possible to compare the three products according to the invention with two conventional products: sintered bauxite and corundum-zirconia with 25% of $ZrO_2$.

|  | Coefficient of abrasion (in mm) | |
| --- | --- | --- |
|  | On XC38 | On Z10CF17 |
| Product No 1 | 4300 | 3200 |
| Product No 2 | 7500 | 3900 |
| Product No 3 | 5600 | 4200 |
| Sintered bauxite | 6 | 30 |
| Corundum-zirconia | 800 | 250 |

The products in accordance with the invention are therefore seen to be highly superior to conventional abrasives, their coefficient = on steel XC38 being at least equal to 4000. In addition it is possible to optimise the abrasive-abraded article pairing by selecting the chemical composition (content of C and N) in dependence on the material to be machined, by carrying out the foregoing tests.

EVALUATION OF REFRACTORY PROPERTIES

The products according to the invention were also tested to evaluate their refractory properties. For that purpose, testpieces of the dimensions of standard refractory bricks (for example 220×110×60 mm) were manufactured from an aggregate produced by crushing the product and granulometric classification in accordance with a FULLER BOLOMEY distribution (100%<5 mm). That aggregate which was mixed with 1.5% of a thermosetting resin of the 'Bakelite' type was shaped in a press and then baked in a non-oxidising atmosphere, with the temperature rising slowly to 1500° C., so as to create ceramic bonds.

Using those testpieces which were manufactured with the same products Nos. 1, 2 and 3 as referred to above, and references of white corundum and brown corundum, comparative tests were carried out to evaluate the refractory properties and the resistance to corrosion by liquid cast iron and slags.

The testpiece bricks were incorporated into the lining of a rotary vessel in a three-phase electric arc test furnace.

After melting of the cast iron and an accompanying slag, the testpieces were removed from the lining, measured and examined. Comparative examination of the corrosion phenomena made it possible to establish a semi-quantitative corrosion index which involves the following:

mechanical degradation due to dissolution of the refractory material by the corrosive phases contained in the furnace, mechanical degradation of the testpieces, due to thermal shock, and corrosion phenomena at the interfaces (cast iron-slag, slag-atmosphere).

Taking white corundum as a reference, the following values are obtained:

|  | Corrosion index |
| --- | --- |
| Product No 1 | 83 |
| Product No 2 | 51 |
| Product No 3 | 48 |
| Brown corundum | 121 |
| White corundum | 100 |

As the level of resistance to corrosion improves in proportion to a decreasing loss in weight due to dissolution and therefore a falling value of the corrosion index, it is clearly apparent that the products according to the invention have corrosion resistance qualities which are markedly superior to those of the best refractory products which are presently available on the market. That resistance therefore appears as a function of the carbon and nitrogen content: it is therefore possible to adjust it according to needs when producing the product.

Resistance to chemical corrosion is not the only quality which is required from a refractory material: it must also preserve good mechanical characteristics in the hot condition. In order to test the behaviour in respect of creep under load at high temperature and in a non-oxidising atmosphere, tests were carried out on cylindrdical testpieces which were taken from bricks produced with the products according to the invention, as indicated above. Those test made it possible to determine an initial creep temperature for each product. The results are as follows:

| Product No 1 | 1760° C. |
|---|---|
| Product No 2 | 1720° C. |
| Product No 3 | 1680° C. |
| Brown corundum | 1690° C. |

It is clear that the corrosion resistance qualities of the products are not achieved at the expense of their mechanical strength in the hot condition since the products according to the invention are equivalent or superior to the brown corundum which is used at the present time. It is noted that the hot characteristics fall away progressively as the carbon and nitrogen content increases.

In service, a refractory material is also subject to major thermal shocks. For that reason tests in respect of resistance to thermal shock were also carried out on the products according to the invention.

100 grams of aggregate of each of refractory products Nos. 1, 2 and 3 as defined above and comparative products, brown and white corundum, of a granulometry of between 4 and 7 mm, were prepared. The products were raised to a temperature of 1500° C. for 15 minutes and then thrown into a large body of water at about 20° C. After drying in a drying oven, the products are sieved over a sieve with a mesh size of 4 mm and the oversize material was weighed before being subjected to a fresh thermal shock cycle which was identical to that described above. The proportion of oversize material in relation to the 4 mm sieve after n thermal shocks characterises each product: the higher that proportion, the better is the resistance to thermal shock.

Taking white corundum as a reference, after five thermal cycles, the following results were obtained:

| Product No 1 | 3.1 |
|---|---|
| Product No 2 | 3.9 |
| Product No 3 | 3.8 |
| Brown corundum | 2.7 |
| White corundum | 1.00 |

It can be seen therefrom that the products according to the invention have a level of resistance to thermal shock which is greatly superior to that of the conventional alumina-based products and that the optimum corresponds to product No. 2 with 2.5% carbon and 1.9% nitrogen.

CONCLUSION

It can be seen therefore that the products according to the invention present a remarkable association of abrasive properties and refractory properties, which are linked to their nitrogen and carbon content, while those properties can also be adjusted to suit the use envisaged by adjusting the nitrogen and carbon contents at the time of preparation of the product.

For use as a refractory material, in particular for the production and treatment of cast irons, they replace most of the refractory materials which are in use at the present time.

For use as abrasive materials, they also have an array of properties which enable them to compete with the best industrial abrasives at the present time, in particular corundum-zirconia materials.

We claim:

1. A multiphase alumina-based material consisting essentially of a matrix of corundum having homogeneously dispersed therein microcrystalline phases of aluminum oxide, aluminum oxycarbide, aluminum oxynitride and aluminum oxycarbonitride in the form of single crystals of size less than 100 microns, said material having a content of carbon in combined form between 0.5 and 5% by weight, and a content of nitrogen in combined form between 0.05 and 5% by weight.

2. A material according to claim 1 wherein the combined carbon content is between 1 and 4% and the combined nitrogen content is between 1 and 4%.

3. A material according to claim 1, wherein the aluminium oxycarbide phase essentially consists of $Al_2OC$.

4. A multiphase abrasive product according to claim 1, 2 or 3 having an abrasion coefficient greater than 800 mm measured on XC38 steel.

5. A multiphase refractory product according to claim 1 or 3 having a point of creep under load that is at least equal to 1650° C., and a high level of resistance to thermal shock and corrosion by cast iron and associated slags.

* * * * *